United States Patent
Baikalov

(10) Patent No.: US 9,060,021 B2
(45) Date of Patent: Jun. 16, 2015

(54) DDOS DETECTION USING SENSOR GRID

(71) Applicant: Bank of America Corporation, Charlotte, NC (US)

(72) Inventor: Igor A. Baikalov, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 20 days.

(21) Appl. No.: 14/014,661

(22) Filed: Aug. 30, 2013

(65) Prior Publication Data

US 2015/0067850 A1  Mar. 5, 2015

(51) Int. Cl.
*H04L 29/06* (2006.01)

(52) U.S. Cl.
CPC .................... *H04L 63/1458* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 7,184,777 | B2* | 2/2007 | Diener et al. | 455/456.1 |
| 7,865,954 | B1* | 1/2011 | Phoha et al. | 726/23 |
| 2007/0001903 | A1* | 1/2007 | Smith et al. | 342/387 |
| 2007/0150565 | A1* | 6/2007 | Ayyagari et al. | 709/223 |
| 2008/0040801 | A1* | 2/2008 | Buriano et al. | 726/22 |
| 2013/0152187 | A1* | 6/2013 | Strebe et al. | 726/11 |

* cited by examiner

*Primary Examiner* — Beemnet Dada
(74) *Attorney, Agent, or Firm* — Banner & Witcoff, Ltd.; Michael A. Springs

(57) ABSTRACT

Methods and apparatus for detecting a network attack are disclosed. A sensor grid may be established in a network (e.g., an enterprise network). The sensors may monitor network assets across various network layers and transmit to a server signals that indicate the probability of an attack on the network. The server may apply an amplification algorithm to combine and amplify all of the received signals into a single signal that more accurately displays the probability of an attack on the network.

20 Claims, 4 Drawing Sheets

DDOS DETECTION USING SENSOR GRID

TECHNICAL FIELD

Aspects of the disclosure relate generally to detecting network attacks in an enterprise.

Specifically, aspects of the disclosure relate to combining and amplifying signals that indicate the probability of a network attack to generate a single signal that indicates the probability of attack across the entire network.

BACKGROUND

The prevalence of network vulnerabilities and network hackers has led to a growing concern about network security. Network security concerns may span various network layers (e.g., application layer, network layer, and the like). One particular type of network attack that has been of growing concern is Distributed Denial of Service (DDoS) attacks. During a DDoS attack, one or more attackers may attempt to disrupt network assets (e.g., applications, systems, and the like).

The earlier a DDoS attack is detected, the better the damage caused by the attack may be mitigated. Prior art systems have attempted to detect network attacks by monitoring the various network layers and transmitting signals that indicate the probability of attack on the network. However, the signals often fail to provide a clear indication of the probability of attack because of the noise of normal network traffic. Furthermore, the signals fail to provide a single indicator of the probability of attack across various network layers.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a computer-implemented method, comprising: receiving, at a server, a plurality of signals from a sensor grid, wherein the signals indicate a probability of a network attack; storing the signals at the server; combining, at the server, each of the plurality of signals to produce a single amplified signal; detecting, at the server, whether a network attack is occurring; and outputting, at the server, a response if a network attack is occurring.

Certain other aspects disclose a non-transitory computer-readable storage medium having computer-executable program instructions stored thereon that, when executed by a processor, cause the processor to: receive, at a server, a plurality of signals from a sensor grid, wherein the signals indicate a probability of a network attack; store the signals at the server; combine, at the server, each of the plurality of signals to produce a single amplified signal; detect, at the server, whether a network attack is occurring; and output, at the server, a response if a network attack is occurring.

Certain other aspects disclose an apparatus comprising: a memory; a processor, wherein the processor executes computer-executable program instructions which cause the processor to: receive a plurality of signals from a sensor grid, wherein the signals indicate a probability of a network attack; store the signals at the memory; combine each of the plurality of signals to produce a single amplified signal; detect whether a network attack is occurring; and output a response if a network attack is occurring.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, sever to explain principles of the disclosure. In the drawings:

DETAILED DESCRIPTION

In accordance with various aspects of the disclosure, methods, non-transitory computer-readable media, and apparatuses are disclosed for detecting network attacks across an enterprise. Network attacks may include cyber attacks on any Open System Interconnection (OSI) layer (e.g., application layer, network layer, and the like) and may include attacks on one or more assets in an enterprise (e.g., applications, systems, and the like). In certain aspects, when a server receives data from a computing device, the server processes and analyzes the data. The automated process may utilize various hardware components (e.g., processors, communication servers, memory devices, and the like) and related computer algorithms to generate image data related to the agency's business data.

Figure 1:
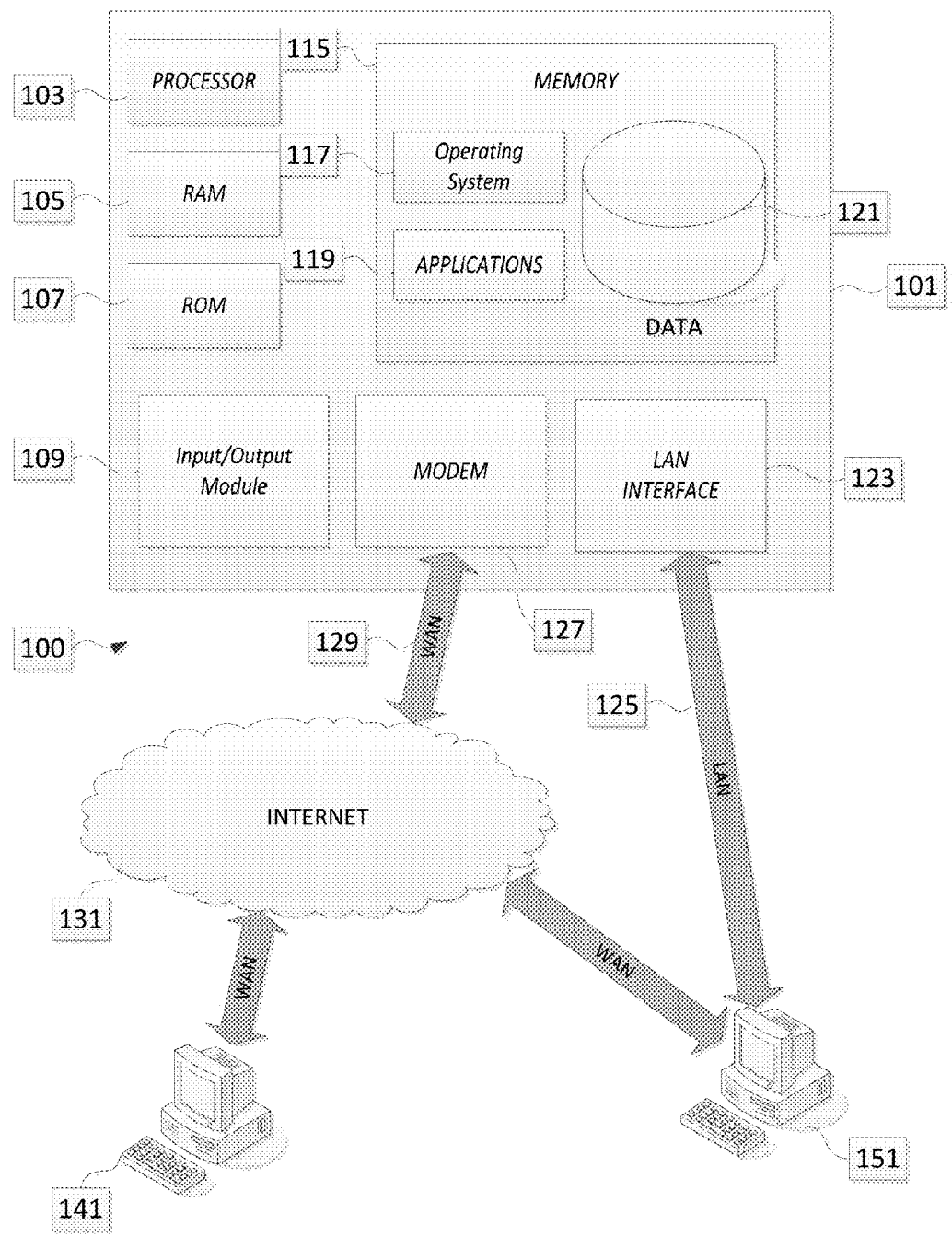
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include a server 101 wherein the processes discussed herein may be implemented. The server 101 may have a processor 103 for controlling the overall operation of the server 101 and its associated components, including random-access memory (RAM) 105, read-only memory (ROM) 107, communications module 109, and memory 115. Processor 103 and its associated components may allow the server 101 to run a series of computer-readable instructions related to receiving, storing, and analyzing data to determine an event's risk level.

Server 101 typically includes a variety of computer-readable media. Computer-readable media may be any available media that may be accessed by server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the server 101 is on and corresponding software applications (e.g., software tasks) are running on the server 101.

Communications module 109 may include a microphone, keypad, touch screen, and/or stylus through which a user of server 101 may provide input, and may also include one or more of a speaker for providing audio output and a video display device for providing textual, audiovisual and/or graphical output.

Software may be stored within memory 115 and/or storage to provide instructions to processor 103 for enabling server 101 to perform various functions. For example, memory 115 may store software used by the server 101, such as an operating system 117, application programs 119, and an associated database 121. Also, some or all of the computer executable instructions for server 101 may be embodied in hardware or firmware.

Server 101 may operate in a networked environment supporting connections to one or more remote computing devices, such as computing devices 141, 151, and 161. The computing devices 141, 151, and 161 may be personal computing devices or servers that include many or all of the elements described above relative to the server 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, server 101 may be connected to the LAN 125 through a network interface or adapter in the communications module 109. When used in a WAN networking environment, the server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate on web pages.

Additionally, one or more application programs 119 used by the server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media.

Computer-readable media include any available media that can be accessed by a server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on server 101. Such a processor may execute computer-executable instructions stored on a computer-readable medium.

Figure 2:
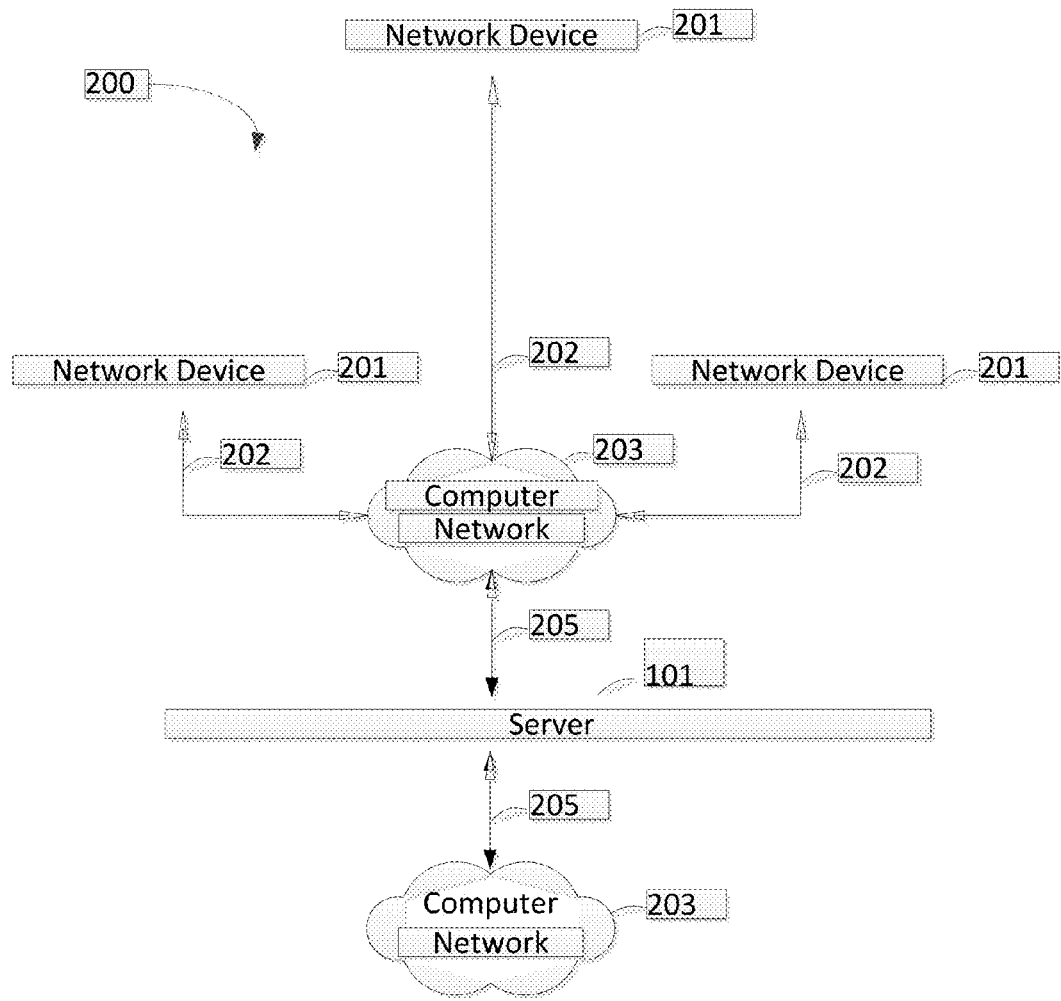
FIG. 2 shows an illustrative shows an illustrative block diagram of workstations and servers that may be used to implement the processes and function of one or more aspects of the present disclosure.

FIG. 2 illustrates another example operating environment in which various aspects of the disclosure may be implemented. As illustrated, system 200 may include one or more workstations 201. Workstations 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/or may be located remotely from the financial institution. For instance, one or more workstations 201 may be located within a branch office of a financial institution. Such workstations may be used, for example, by customer service representatives, other employees, and/or customers of the financial institution in conducting financial transactions via network 203. Additionally or alternatively, one or more workstations 201 may be located at a user location (e.g., a customer's home or office). Such workstations also may be used, for example, by customers of the financial institution in conducting financial transactions via computer network 203.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between workstations 201 and server 204, such as network links, dial-up links, wireless links, hard-wired links, and/or the like.

In an embodiment, an enterprise, such as a bank or a financial institution, may service customer requests outside sources. For example, a bank may service customer requests generated at an outside computing device and routed to a bank computing device through the Internet. These requests may include customer requests to electronically manage a customer account with the bank. In some examples, the organization may service a large number of customer requests and may receive these requests from a large number of outside computing devices. In these instances, the enterprise may be susceptible to various types of network attacks.

For instance, the organization may be susceptible to distributed denial of service (DDoS) attack or a denial of service (DoS) attack (hereinafter collectively referred to as DDoS attack). In a DDoS attack, a magnitude of customer requests are generated from multiple outside computing devices where the requests are designed to disrupt the organization's business operations. For example, in an HTTP DDoS attack, the magnitude of customer requests may be a plurality of HTTP GET requests. If the attack includes a large enough number of such requests, the computing devices at the organization responsible for servicing such requests may become overloaded. In this example, the organization might not be able to service legitimate requests because the organization's computing devices are busy servicing the requests from the DDoS attack or because the requests from the DDoS attack overloaded these computing devices to the point of failure.

A network attack, such as a DDoS, may be implemented in a number of different ways. For example, a DDoS attack may comprise a layer 4 attack, a layer 7 attack, or any other suitable attack. The attack may be described as a layer attack because the attack takes place at a certain layer of a communication model, such as the OSI communication systems model. For example, a layer 4 attack may occur at a transport layer of the OSI model. The transport layer may include Transmission Control Protocol (TCP) or User Datagram Protocol (UDP) communications. As such, a requester may perform a layer 4 attack by flooding a computing device, such as a server, with SYN packets that are designed to overwhelm the computing device while it attempts to initiate a TCP connection with the requester. Layer 7 of the OSI model comprises the application layer. The application layer may include application level communications, such as Hypertext Transfer Protocol (HTTP) and File Transfer Protocol (FTP) communications. As such, a requester may perform a layer 7 attack by flooding a computing device, such as a server, with HTTP requests, such as HTTP GET requests or HTTP POST requests, that are designed to overwhelm the computing device while it attempts to service the HTTP requests. DDoS attacks may also include attacks at other layers of the OSI model.

The enterprise network may preferably utilize a sensor grid to monitor network traffic and detect network attacks. The sensor grid may comprise one or more sensors for monitoring the traffic in the network. A sensor may provide data to one or more servers (e.g., server 101) that indicates the probability that an attack is occurring on the network. In some aspects, each sensor may collect statistical information about data (e.g., packets, and the like) transmitted over a network. The sensors may monitor the data transmitted over the network and then transmit sensor data to server 101. The sensor data may comprise statistical information accumulated from the network traffic monitored by the respective sensor. In some aspects, sensor data may comprise signals that provide information regarding the network information being monitored by the sensor. In certain aspects, each sensor may transmit sensor data to server 101 at fixed intervals (e.g., every 10 minutes, every hour, and the like). Server 101 may access sensor data upon request in some aspects. In certain aspects, sensors in the sensor grid may be provided in an enterprise layer across various OSI layers. For example, some sensors may monitor activity in the data link layer, while others are dedicated to monitoring the application layer, and yet others monitor the network layer, and the like.

Having described an example of a computing device that can be used in implementing various aspects of the disclosure and an operating environment in which various aspects of the disclosure can be implemented, several embodiments will now be discussed in greater detail.

Figure 3:
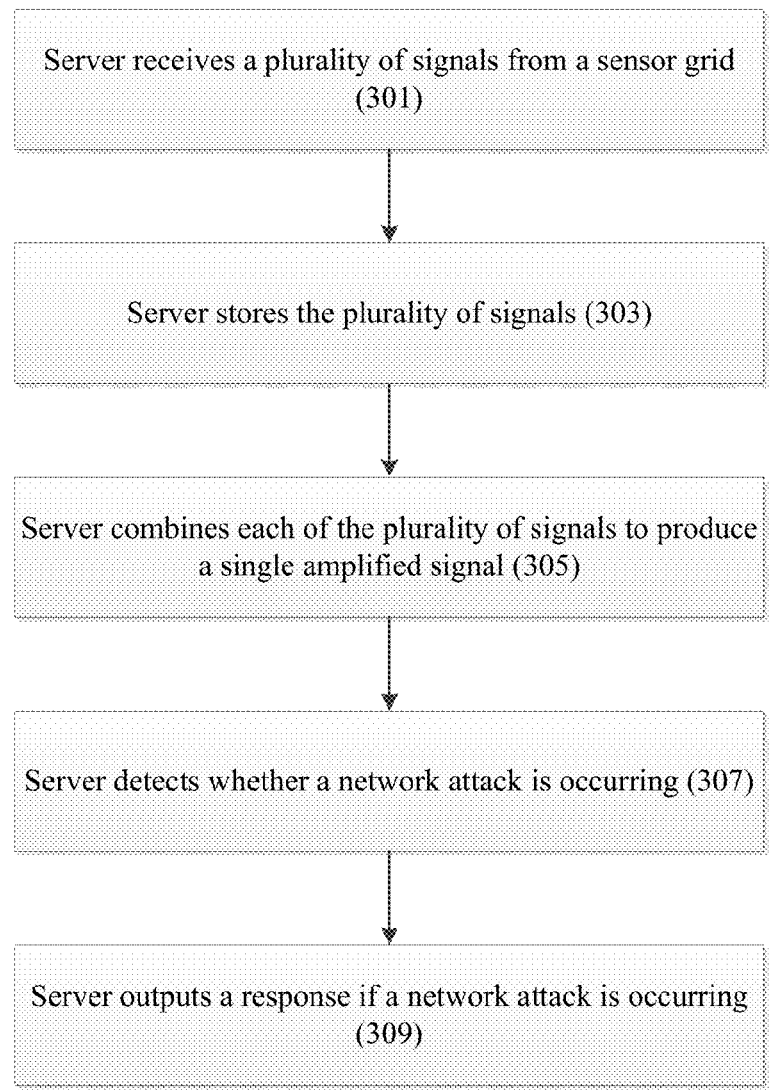
FIG. 3 shows an illustrative flow chart in accordance with aspects of the disclosure FIG. 4 show an illustrative example of combining and amplifying sensor data in accordance with various aspects of the disclosure.

FIG. 3 illustrates a flow chart for detecting a network attack according to certain aspects of the disclosure. The process shown in FIG. 3 may begin at step 301 when server 101 receives a plurality of signals from a sensor grid. The sensor grid may comprise a plurality of sensors. Each sensor may monitor one or more assets or network information in a particular layer of the network. For example, a sensor may monitor network information received from a main switch. Another sensor may monitor network information received from an Intrusion Detection System (IDS). Yet another sensor may monitor network information obtained from load balancers, and another may monitor information received from web servers. The web server information monitored by one or more sensors in the sensor grid may include sensor performance characteristics (e.g., CPU utilization, memory utilization, and the like) and server load information.

At step 301, one or more of the sensors may transmit sensor data (e.g., signals) to server 101. In some aspects, one or more of the sensors may transmit signals to server 101 at fixed intervals. The fixed intervals may be predetermined by server 101 or another third-party (e.g., network administrator). Sensors may also transmit signals to server 101 upon detecting, at the sensors, that the probability of a network attack has increased. Sensors may detect an increased probability of attack according to one or more indicators, including an increase in the frequency of network requests, detection of signatures in network requests that indicate a malicious attack, malfunctioning application, and the like. In certain other aspects, server 101 performs the detection that a probability of attack has increased.

After server 101 receives the plurality of signals at step 301, it may proceed to store the signals at step 303. Server 101 may store the signals at memory 115. In some aspects, server 101 may store the plurality of signals along with other sensor data at database 121. In certain other aspects, server 101 may not store the signals prior to proceeding to step 305.

At step 305, server 101 may combine each of the plurality of signals it received from the sensor grid to produce a single amplified signal. The plurality of signals may be combined and amplified by processor 103. In some aspects, the signals may be combined and amplified by a signal amplifier stored at server 101. The signals may be combined and amplified according to an amplification algorithm stored at server 101. The amplification algorithm may, for instance, instruct server 101 to convert each signal into a probability of a network attack and to multiply the probabilities to produce a single amplified signal. In some other aspects, the amplification algorithm may instruct server 101 to convert each signal into a probability that a network attack is not occurring. The amplification algorithm may then instruct server 101 to determine the inverse of the probability that a network attack is not occurring to generate a single amplified signal indicating the probability that an attack is occurring on the network.

Figure 4:
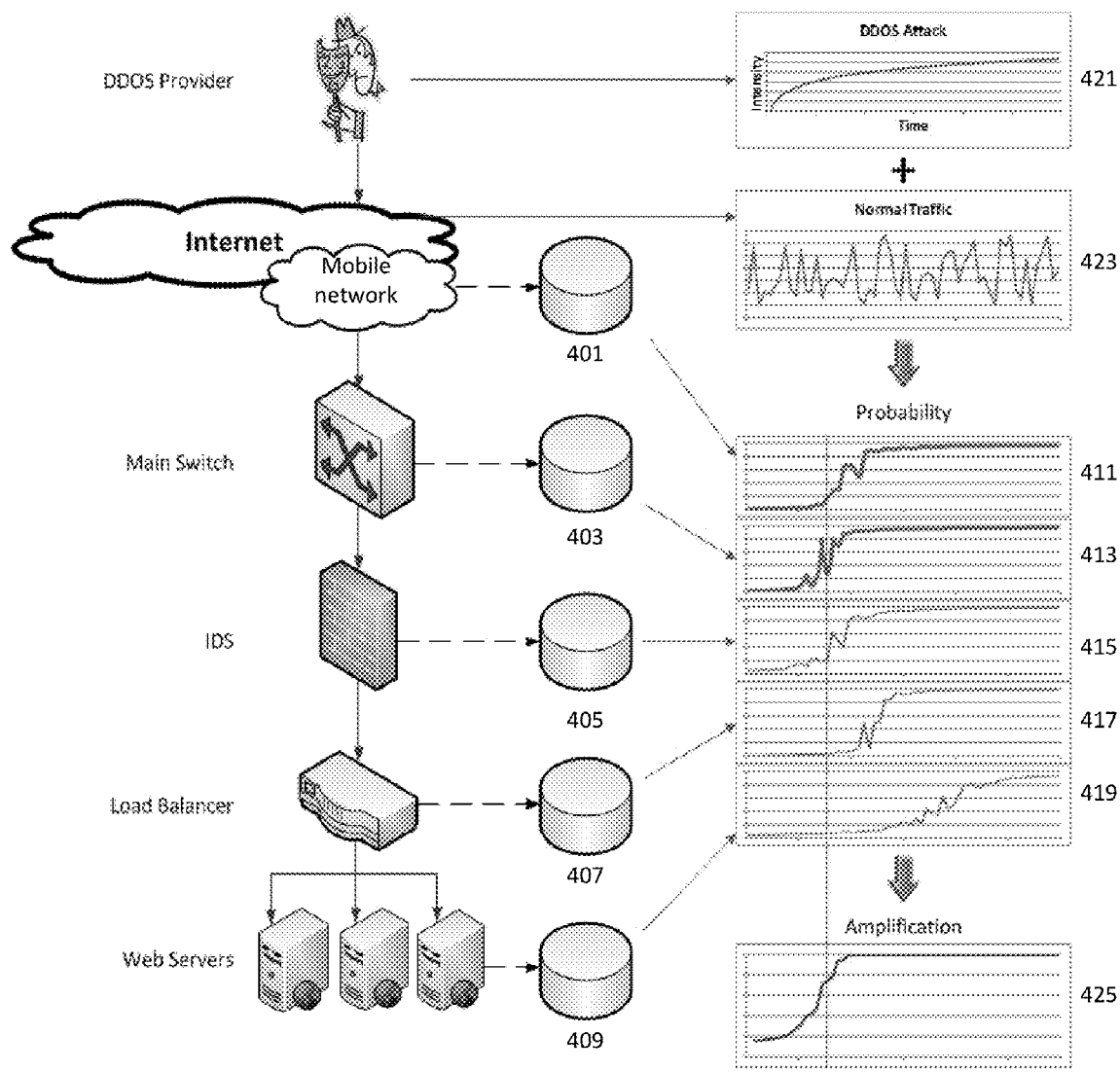

FIG. 4 illustrates shows an example of how signals may be combined and amplified at server 101 to generate a single amplified signal that indicates the probability of a network attack. Chart 421 displays the intensity of a DDoS attack over time. As shown in chart 421, the intensity of a DDoS attack may often increase over time. In many instances, the intensity of a DDoS attack may increase exponentially over time. Thus, it may be particularly beneficial to detect DDoS and other network attacks early in the attack to mitigate damage to network assets and resources. However, the DDoS attack may only originate from a few assets on the network (e.g., one or more users, servers, and the like attacking the network).

Conversely, normal traffic on the network may produce much noisier signals, as shown in chart 423. Thousands or millions of network users may access a network's resources at any given, particularly for large enterprises. The normal traffic on the network (e.g., a website) may typically experience significant fluctuations similar those illustrated in chart 423. Throughout a given time period (the x-axis) the intensity of normal traffic (the y-axis) may experience significant rises and drops. Because the volume of normal network traffic may typically far exceed the initial volume of DDoS traffic, the noise associated with the normal traffic may make it difficult for the sensor grid or server 101 to detect a DDoS attack on time. For example, sensors 401-409 may each monitor one more assets in a network (e.g., main switch, IDS, load balancer, web servers, and the like) as discussed above. Each sensor may transmit a signal (e.g., signals 411-419) to server 101. Each signal 411-419 may provide the results of the monitoring performed by each respective sensor 401-409.

For instance, sensor 403 may monitor the amount of traffic passing through a main switch (e.g., at a network layer). Sensor 403 may generate and transmit signal 413 to server 101. As shown at signal 413, the intensity of the traffic passing through the main switch (y-axis) gradually increases until it reaches a plateau. However, the ramp up period to the plateau is very noisy as the normal traffic continues its fluctuations. Other sensors may also produce signals displaying a ramp up period before the intensity plateaus at a certain point. For example, sensor 405 may monitor an IDS (e.g., at a transport layer). At a certain point, sensor 405 may transmit signal 415 to server 101. Signal 415 may indicate the number of malicious activities detected in the network over time. Similar to signal 413, signal 415 may also indicate that the number of malicious activities on the network experiences a ramp up period followed by a plateau. Thus each of the sensors in the sensor grid may produce a different signal (e.g., signals 411-419) that is indicative of a probability that an attack is occurring on the network.

Server 101 may combine and amplify the received signals (e.g., signals 411-419) to produce a single amplified signal (e.g., signal 425). The single amplified signal may provide server 101 with a single indicator that may be used to monitor network security across all layers. This may be particularly beneficial because sensors in the sensor grid may not communicate with one another as each sensor may not monitor the same OSI layer. By combining all of the received signals, server 101 may be able to monitor all layers from a single indicator. Moreover, by amplifying the combined signals, server 101 may be able to reduce the signal to noise ratio of the single amplified signal, thereby providing an earlier more clear indicator of an attack. In other words, the single amplified signal may provide a more reliable indicator of a network attack.

Server 101 may analyze the single amplified signal to detect whether a network attack is occurring at step 307. The single amplified signal may be a combination and amplification of signals indicative of a DDoS attack. Each of the signals may be transmitted from sensors that may monitor network information indicative of a network attack (e.g., frequency of network requests, signatures in network requests that indicate a malicious attack, malfunctioning applications, overloaded servers and the like). By detecting an abnormal increase in intensity of the sensor data (e.g., signals), server 101 may detect whether a network attack is occurring. In some aspects, server 101 may ideally detect a network attack during the ramp up period before the DDoS attack reaches its plateau and potentially causes significant damage to the network.

The vertical red line drawn through signals 411-419 and single amplified signal 425 highlights a time X. As shown in the signals of FIG. 4, at time X each of the signals may display a ramp up period. The ramp up period may be a period when more servers and endpoints join the attack over time. However, signals 411-419 fail to clearly display a clear ramp up period indicating a DDoS attack. Some signals may be too noisy (e.g., signals 413 and 415), whereas others may not yet indicate that ramp up is occurring at time X (e.g., signals 411, 417, and 419). For example, signal 419 may indicate server load information which may be late in the chain of events of a DDoS attack and, therefore, not exhibit the effects of the attack until later. Conversely, single amplified signal 425 may display a much cleaner, less noisy ramp up period (with the added benefit of reducing false positives at server 101). The detection of the ramp up period may cause server 101, or a third party to act on the potential DDoS attack.

At step 309, server 101 may output a response if it determines a network attack is occurring. Examples of such responses may include blocking the source of the network attack (e.g., identifying the source via its IP address), diverting network traffic to a black hole (e.g., directing the traffic away from the network's website), and other similar mitigation methods. In some aspects, if server 101 does not detect a DDoS attack, the process shown in FIG. 3 may return to step 301, where server 101 may receive more signals from the sensor grid.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A computer-implemented method, comprising:
receiving, at a server, a plurality of signals from a sensor grid comprising a plurality of sensors that monitor network information, wherein individual sensors of the plurality of sensors are associated with individual assets of a network, and wherein the signals indicate a probability of a network attack;
storing the signals at the server;
combining and amplifying, at the server, each of the plurality of signals to produce a single amplified signal;
detecting, at the server, whether a network attack is occurring based, at least in part, on whether the single amplified signal indicates an increased intensity; and
outputting, at the server, a response if a network attack is occurring.

2. The method of claim 1, wherein the combining further comprises amplifying the plurality of signals according to an amplification algorithm.

3. The method of claim 1, wherein the plurality of signals indicate a probability of a network attack at a plurality of network layers.

4. The method of claim 1, wherein the network attack is a distributed denial of service (DDoS) attack.

5. The method of claim 1, wherein the single amplified signal provides a single indicator of a probability of attack across all network layers in a network.

6. The method of claim 2, wherein the amplification algorithm comprises a multiplication of probabilities that an attack is not occurring.

7. The method of claim 1, wherein the response comprises one or more of the following: blocking the source of the network attack and diverting network traffic to a black hole.

8. A non-transitory computer-readable storage medium having computer-executable program instructions stored thereon that, when executed by a processor, cause the processor to:
receive, at a server, a plurality of signals from a sensor grid comprising a plurality of sensors that monitor network information, wherein individual sensors of the plurality of sensors are associated with individual assets of a network, and wherein the signals indicate a probability of a network attack;
store the signals at the server;
combine and amplify, at the server, each of the plurality of signals to produce a single amplified signal;
detect, at the server, whether a network attack is occurring based, at least in part, on whether the single amplified signal indicates an increased intensity; and
output, at the server, a response if a network attack is occurring.

9. The non-transitory computer-readable storage medium of claim 8, wherein the instructions to combine further cause the processor to amplify the plurality of signals according to an amplification algorithm.

10. The transitory computer-readable storage medium of claim 8, wherein the plurality of signals indicate a probability of a network attack at a plurality of network layers.

11. The transitory computer-readable storage medium of claim 8, wherein the network attack is a distributed denial of service (DDoS) attack.

12. The transitory computer-readable storage medium of claim 8, wherein the single amplified signal provides a single indicator of a probability of attack across all network layers in a network.

13. The transitory computer-readable storage medium of claim 9, wherein the amplification algorithm comprises a multiplication of probabilities that an attack is not occurring.

14. The transitory computer-readable storage medium of claim 8, wherein the response comprises one or more of the following: blocking the source of the network attack and diverting network traffic to a black hole.

15. An apparatus comprising:
a memory;
a processor, wherein the processor executes computer-executable program instructions which cause the processor to:
receive a plurality of signals from a sensor grid comprising a plurality of sensors that monitor network information, wherein individual sensors of the plurality of sensors are associated with individual assets of a network, and wherein the signals indicate a probability of a network attack;
store the signals at the memory;
combine and amplify of the plurality of signals to produce a single amplified signal;
detect whether a network attack is occurring based, at least in part, on whether the single amplified signal indicates an increased intensity; and
output a response if a network attack is occurring.

16. The apparatus of claim 15, wherein the instructions to combine further cause the processor to amplify the plurality of signals according to an amplification algorithm.

17. The apparatus of claim 15, wherein the plurality of signals indicate a probability of a network attack at a plurality of network layers.

18. The apparatus of claim 15, wherein the network attack is a distributed denial of service (DDoS) attack.

19. The apparatus of claim 15, wherein the signal amplified signal provides a single indicator of a probability of attack across all network layers in a network.

20. The apparatus of claim 15, wherein the response comprises one or more of the following: blocking the source of the network attack and diverting network traffic to a black hole.

* * * * *